(12) United States Patent
Smithson et al.

(10) Patent No.: US 6,886,099 B1
(45) Date of Patent: Apr. 26, 2005

(54) COMPUTER VIRUS DETECTION

(75) Inventors: Robert Hugh Smithson, Cheltenham (GB); Andrew Arlin Woodruff, Aylesbury (GB); Anton Christian Rothwell, Aylesbury (GB); Jeffrey Martin Green, Aylesbury (GB); Christopher Scott Bolin, Buckland (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 842 days.

(21) Appl. No.: 09/660,300

(22) Filed: Sep. 12, 2000

(51) Int. Cl.$^7$ .......................... G06F 11/30; G06F 15/16
(52) U.S. Cl. ...................... 713/200; 709/206
(58) Field of Search ................. 709/200, 205, 709/206, 223, 224; 713/200, 201; 706/15, 16

(56) References Cited

U.S. PATENT DOCUMENTS

| | | | | |
|---|---|---|---|---|
| 5,278,901 A | * | 1/1994 | Shieh et al. ................. | 713/200 |
| 5,440,723 A | * | 8/1995 | Arnold et al. ................ | 714/2 |
| 5,832,208 A | * | 11/1998 | Chen et al. ................. | 713/201 |
| 5,956,481 A | * | 9/1999 | Walsh et al. ................ | 713/200 |
| 6,016,546 A | * | 1/2000 | Kephart et al. ............. | 713/200 |
| 6,701,440 B1 | * | 3/2004 | Kim et al. .................. | 713/201 |
| 2002/0105545 A1 | * | 8/2002 | Carter et al. ............... | 345/752 |
| 2002/0152399 A1 | * | 10/2002 | Smith ........................ | 713/200 |
| 2002/0194490 A1 | * | 12/2002 | Halperin et al. ............ | 713/200 |
| 2003/0167402 A1 | * | 9/2003 | Stolfo et al. ................ | 713/200 |
| 2004/0054498 A1 | * | 3/2004 | Shipp ........................ | 702/182 |
| 2004/0083372 A1 | * | 4/2004 | Williamson et al. ....... | 713/188 |
| 2004/0103159 A1 | * | 5/2004 | Williamson et al. ....... | 709/206 |
| 2004/0111632 A1 | * | 6/2004 | Halperin .................... | 713/200 |

OTHER PUBLICATIONS

Johnston, "McAfee Shields Against Virus Outbreaks", Aug. 17, 2000, PCWorld, p. 1–2.*
Spain, "An In–Depth Look at E–mail Borne Viruses" May 12, 2000, p. 1–2.*
"Symantec Mail Security for Microsoft Exchange Implementation Guide," 2003, Symantec Corporation, p. 150–153.*
"How to Configure Outbreak Management with Symantec Antivirus/Filtering 3.0 for Microsoft Exchange," Jan. 7, 2002, p. 1–3.*

* cited by examiner

*Primary Examiner*—Ayaz Sheikh
*Assistant Examiner*—Christopher Revak
(74) *Attorney, Agent, or Firm*—Zilka-Kotab, PC; Christopher J. Hamaty

(57) ABSTRACT

A computer virus outbreak is detected by comparing one or more measurement parameters determined over a measurement period against a threshold level. The measurement parameters can include a measurement of how many E-mail messages are sent having an identical file attachment, file type or simply in total. The threshold levels may be varied with the time of day and day of week as well as the tests applied.

27 Claims, 15 Drawing Sheets

Number

Please enter the new numeric value :

5

OK    Cancel

Time

Please enter the new time value :

Hour(s):    Minute(s):

1    20

OK    Cancel

FIG. 9

Threshold

Threshold Scale Values

Threshold

Threshold

Mon   Tue   Wed   Thu   Fri   Sat   Sun

FIG. 10

Emergency Response Event

Specify the actions and step to carry out:

| Step | Action | Escalation Time |
|---|---|---|
| 0 | Update DAT files (GroupShield Exc... | 0 hr(s) 1 min(s) |
| 1 | Reduce notifications (GroupShield ... | 0 hr(s) 10 min(s) |

Move Up | Move Down | Add | Remove

☐ Create an emergency response report

< Back | Next > | Cancel | Help

FIG. 16

Available Actions

| Component | Action |
|---|---|
| GroupShield Exchange | Delete on Infection |
| GroupShield Exchange | Reduce notifications |
| GroupShield Exchange | Hide Mailboxes |
| GroupShield Exchange | Hide distribution lists |
| GroupShield Exchange | Perform On-Demand Scan |
| GroupShield Exchange | Update DAT files |
| GroupShield Exchange | Down the Exchange Server |
| GroupShield Exchange | Increase Scanning Options |

Escalation Time

Escalate after : 0 hr(s) 0 min(s)

OK | Cancel

FIG. 17

Emergency Response Event

Specify the name for this event :

Event1

Event Summary :

Event Name : 'Number of Identical Attachment types in a Time
Event Desc : 500 identical attachment types in 1 hours 20 minu
Reaction to an Emergency is Automatic
Email Notification is Enabled. Email will be sent to 'a@a.com'

Automatic Actions

Step, Action and escalation times

0        Update DAT files (0 hr(s) 1 min(s))

[< Back]  [Finish]   [Cancel]   [Help]

FIG. 18

COMPUTER VIRUS DETECTION

BACKGROUND OF THE INVENTION

1. Field of the Invention

This invention relates to the field of data processing systems. More particularly, this invention relates to the detection of an outbreak of a computer virus on a data processing system.

2. Description of the Prior Art

It is known to detect computer viruses using signature definitions of those viruses. In this technique, when a new virus is discovered, a characteristic pattern of computer instructions is identified associated with the virus and this characteristic pattern then added to a library of computer virus definitions so that a suspect file can be compared against this library of definitions to determine whether it contains one of the known computer viruses identified within the library.

An alternative approach to virus identification is heuristic testing in which types of activity associated with viruses are searched for and used to identify candidate viruses. As an example, an executable computer file that has at its start a call to a routine located at the end of the executable file is a strong candidate for having been infected with a virus.

A problem with both of the above techniques is that they are only generally capable of detecting known viruses or viruses behaving in known ways. As an example, it is only after a virus has been created, released and infected innocent users, that it will be drawn to the attention of anti-virus system makers who can then add a new virus definition to their library of definitions characteristic of the newly released virus to enable its detection by the library technique. Similarly, a virus with a new type of action, such as Word macro viruses when they were first released, present a problem for heuristic identification since their patterns of activity are not ones that are being tested for until after those new viruses have been created, released and infected innocent users.

It is known from Trend's Scan Mail Exchange Beta Release to provide a system in which a virus outbreak is notified if more than a threshold number of known viruses are detected within a 24 hour period. This technique does not address unknown viruses and types of virus behavior.

SUMMARY OF THE INVENTION

It is an object the present invention to provide improved anti-virus systems that are able to provide some defense against new viruses and new types of virus.

Viewed from one aspect the present invention provides a computer program product for detecting an outbreak of a computer virus on a computer apparatus, said computer program product comprising:

(i) measurement computer code operable to measure one or more measurement parameters indicative of non virus specific activity of said computer apparatus over a respective measurement period;

(ii) comparison computer code operable to compare said one or more measurement parameters with respective predetermined threshold levels; and (iii) signal generating computer code operable to generate a signal indicative of an outbreak of a computer virus if one or more of said one or more measurement parameters crosses a respective predetermined threshold level.

The invention uses a new virus detection approach. In particular, the invention detects an outbreak of a computer virus by measuring parameters of the activity of the computer system as a whole over a measurement period. The technique does not seek to detect an individual virus by its fingerprint or characteristic manner of execution, but instead measures non virus specific activity. It has been found that when a computer system is subject to an outbreak of a computer virus, then it exhibits certain measurable characteristics that may be useful in detecting the occurrence of the virus outbreak. More particularly, since the technique of the invention is not looking for an individual virus or pattern of execution of a virus, it is able to more readily detect previously unknown viruses by the effect that they have on the activity of the computer system as a whole. The predetermined threshold levels may be manually set or may automatically vary in dependence upon detected long-term behaviour.

As preferred examples of the measurement parameters that may be used there are proposed:

1. How many E-mail messages are sent having an identical message title.
2. How many E-mail messages are sent identical file attachment.
3. How many email messages are sent having a file attachment of a given file type.
4. How many E-mail messages are sent having a file attachment that is an executable file.
5. The E-mail through put within the computer system.
6. The E-mail throughput measured in a form dependent upon a number of E-mails multiplied by a total size for the E-mails.

It will be appreciated by those in the field that the usage patterns of a computer system typically vary considerably with the time of day. In an office environment, there is usually considerably higher computer system usage during working hours than outside working hours. Even within working hours, there are often peaks in activity which can have corresponding effects upon the measurement parameters monitored by the invention, e.g. peaks in activity shortly before lunch and in mid afternoon.

In preferred embodiments of the invention the predetermined threshold levels can be varied in dependence upon the time of day and the day of the week.

More generally, the measurement parameters monitored by the system may be selected by the user and the measurement periods over which activity is measured (using a variety of different statistical measurement techniques) may be user selected to adapt the anti-virus system to the particular computer system upon which it is operating.

The invention also provides a method of detecting an outbreak of a computer virus on a computer apparatus and an apparatus for detecting an outbreak of a computer virus on a computer apparatus.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 7 to 23 illustrate how the virus outbreak detection and automated sequence of response actions may be configured by a user.

DESCRIPTION OF THE PREFERRED EMBODIMENTS

Figure 1:
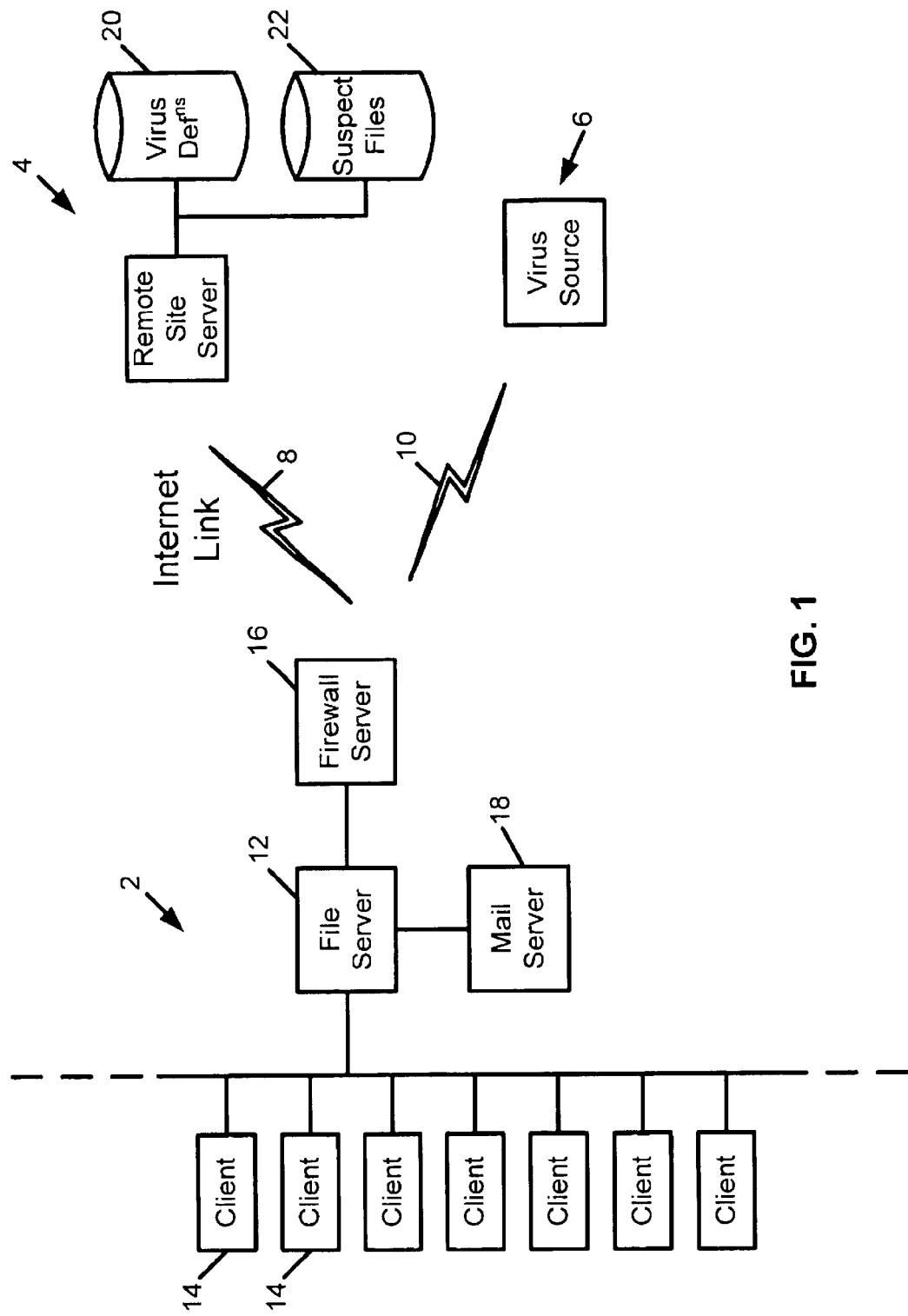
FIG. 1 schematically illustrates a computer system of the type it is desired to protect from computer viruses connected to other computer systems via network links.

FIG. 1 shows a computer system 2 coupled to remote computer systems 4 and 6 via internet network links 8, 10. The computer system 2 comprises a local area network. The local area network 2 is formed of a file server 12 to which a plurality of client computers 14 are linked by conventional local network connections. The file server 12 is linked to the remote computers 4, 6 via a firewall server 16 that serves to resist hacking and other security attacks. A mail server 18 coupled to the file server 12 provides E-mail services to the local area network 2. More particularly, the mail server 18 receives E-mail messages with associated attachments from remote computers.

A remote computer 6 may be a virus source. The virus source 6 may be unwitting in that it is merely passing on an infection it has itself incurred. Alternatively, the virus source 6 could be controlled by the virus originator. A computer virus may be introduced into the local area network 2 from the virus source 6 via an E-mail attachment, a security breach of the firewall server 16, a removable media introduced by a user or in some other way.

The local area network 2 is also coupled to a remote computer 4 that is controlled by the anti-virus system provider. This remote computer 4 includes a library of virus definitions 20 and a repository for suspect files 22. The anti-virus provider will frequently update the virus definitions stored by the remote computer 4 to reflect the latest viruses that have been discovered. Computer files suspected by users of the anti-virus system as being infected with a computer virus can be automatically sent to the suspect files repository 22 by the user computers so that they may be analysed as rapidly as possible by the anti-virus system provider.

Figure 2:
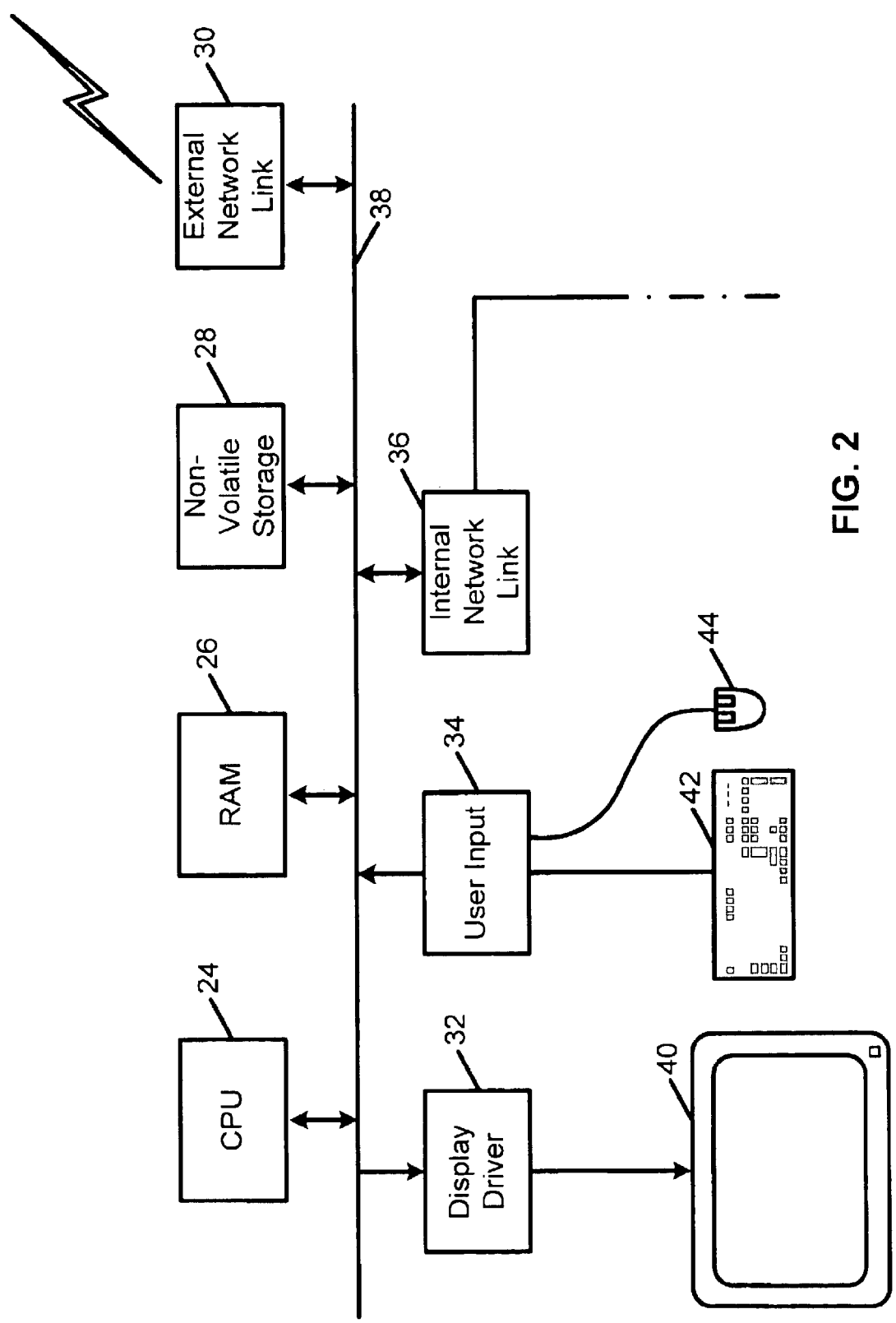
FIG. 2 illustrates a server computer for embodying one example of the present invention.

FIG. 2 schematically illustrates a general purpose computer of the type capable of executing the software which can embody the present invention. The computer includes a central processing unit 24, a working memory 26, a non-volatile memory 28 (such as a hard disk drive or an ROM), an external network link 30, a display driver 32, a user input interface 34 and an internal network link 36. The above items are linked via a common bus 38. A display monitor 40 is coupled to the display driver 32 and a keyboard 42 and a mouse 44 are coupled to the user input interface 34.

In operation, the computer system illustrated in FIG. 2 can execute a computer program stored within the non-volatile storage 28 using the working memory 26. The computer system may receive information or send information via either the external network link 30 or the internal network link 36. The computer software will control the display driver 32 to produce images and text upon the monitor 40 to enable a user manipulating the keyboard 42 and the mouse 44 to interact and control the computer program executing on the computer system.

The controlling computer program that controls the computer is stored in the non-volatile storage 28. The computer program may be recorded on a floppy disk, or a CD for distribution. Alternatively, the computer program may be obtained as a product by downloading via the external network link 30.

Figure 3:
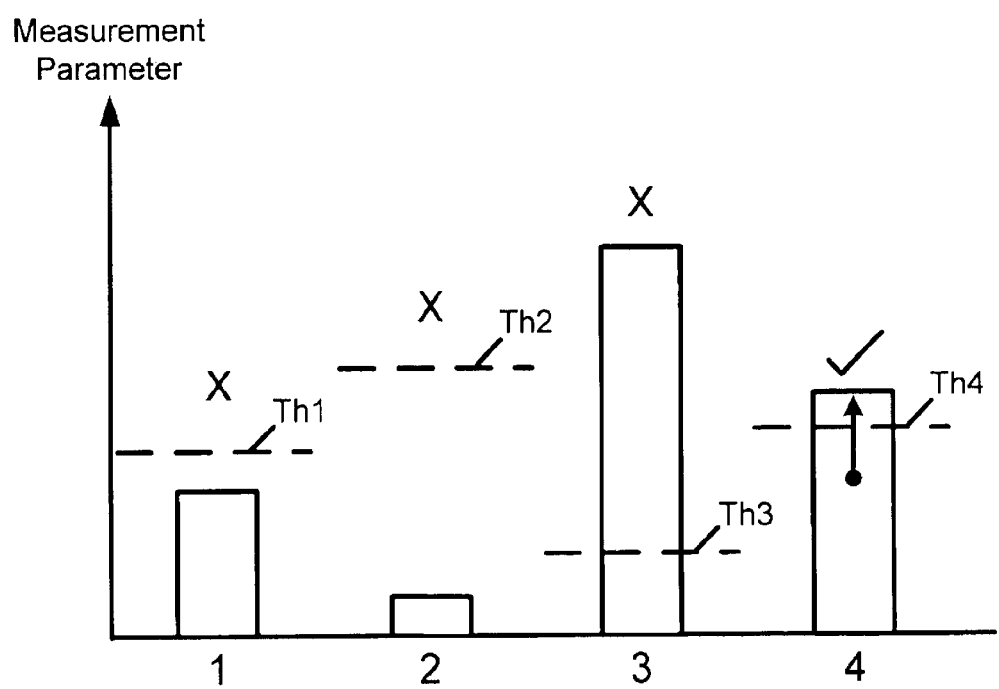
FIG. 3 illustrates the comparison between measurement parameters and predetermined threshold values.

The computer program executing on the computer system of FIG. 2 seeks to detect a virus outbreak by monitoring one or more measurement parameters obtained over a measurement period against predetermined threshold levels. This process is illustrated in FIG. 3. FIG. 3 shows four measurement parameters with their associated (user controlled) threshold levels Th1, Th2, Th3 and Th4. The computer program periodically checks each of the measurement parameters against its respective threshold to determine if that threshold has been crossed. In the case of the measurement parameters 1, 2 and 4, the normal state for these measurement parameters is less than their respective threshold values. Conversely, the normal state for the measurement parameter 3 is greater than its threshold value. In the example illustrated in FIG. 3, the measurement parameters 1, 2 and 3 are all normal whilst the measurement parameter 4 has crossed (exceeded) its threshold value (Th4) resulting in generation of a signal indicating an outbreak of a computer virus. The measurement parameters can take many different forms. Examples of suitable measurement parameters are:

1. How many E-mail messages are sent having an identical message title within a predetermined period;
2. How many E-mail messages are sent having an identical file attachment within a predetermined period;
3. How many E-mail messages are sent having a file attachment of a given file type (e.g. a EXE, COM or DOC) within a predetermined period;
4. How many E-mail messages are sent having a file attachment that is an executable file within a predetermined period; and
5. That the E-mail throughput measured as the number of messages multiplied by their size exceeds a predetermined level within a predetermined period.

It will be appreciated that the way in which the measurement parameters may be derived could take various different forms. The system could look at a rolling average over the measurement period, a peak value within a measurement period, a simple count of instances within a measurement period or various other measurements suited to the particular parameter concerned.

In the case of the above examples relating to E-mail behaviour on a computer system, existing computer E-mail program products, such as Microsoft Exchange Server (produced by Microsoft Corporation), already provide performance monitoring variables that may be read by other programs to gain information concerning the E-mail activity of the computer system. Similarly, many other measurement parameters are already available within computer systems as provided by operating systems or other computer programs executing on these systems. The computer program seeking to detect computer virus outbreaks can read and use these existing parameters. Alternatively, if desired, the computer program may include routines that themselves derive parameters indicative of the activity of the computer system. Conventional programming techniques may be used to derive these parameters.

Figure 4:
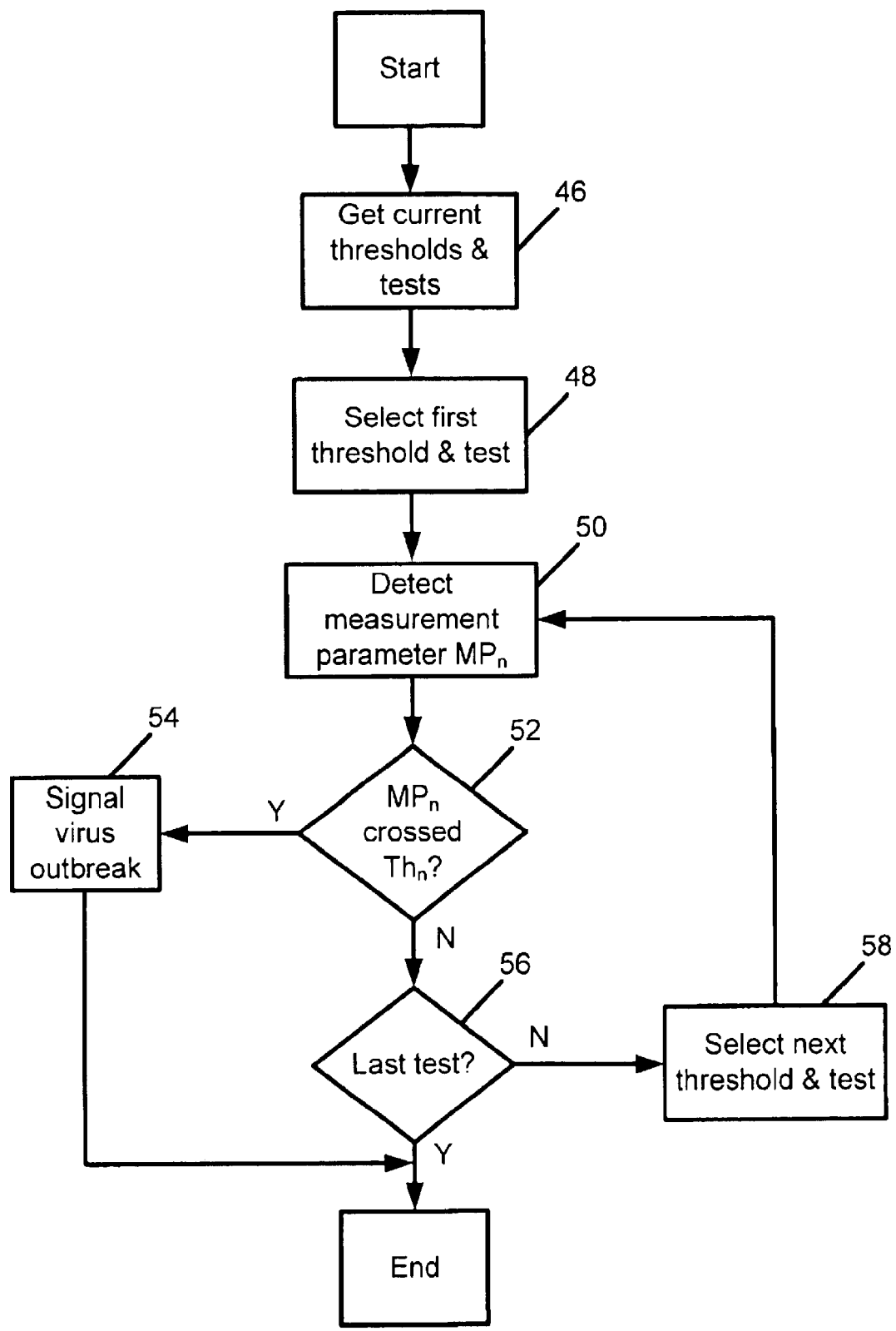
FIG. 4 is a flow diagram illustrating the process for detecting a virus outbreak.

FIG. 4 is a flow-diagram illustrating the computer virus outbreak detection technique of the present invention. At step 46 the system reads the current threshold levels and tests that are to be applied. The threshold levels and tests may be varied with the time of day and day of week in dependence upon a user defined schedule. As a simple example, a business hours and an out of hours set up may be configured with different tests and threshold levels being applied in these different respective periods. Step 46 serves to read the thresholds and tests that are to be applied at the current time and day.

Step 48 selects the first test from the list together with its associated threshold value and an indication of whether its normal state is above or below the threshold value.

Step 50 detects the measurement parameter $MP_n$ associated with the currently selected test. As previously mentioned, this may be read from another computer program or derived by the anti-virus system itself.

At step 52 the detected measurement parameter $MP_n$ is compared with its associated threshold value $Th_n$. If the threshold value is crossed, then processing proceeds to step 54 at which a signal indicating a virus outbreak is generated.

If the threshold value is not crossed, then processing proceeds to step 56 where a test is made to see if the last test has yet been reached. If the last test has not yet been reached, then the next test and threshold are selected at step 58 and processing is returned to step 50. If the last test has been reached, then processing terminates.

It will be appreciated that the process illustrated in the flow-diagram of FIG. 4 will be repeatedly executed at an interval that may be set so as to provide as rapid as needed detection of a virus outbreak without consuming an excessive amount of computer processing resources.

Figure 5:
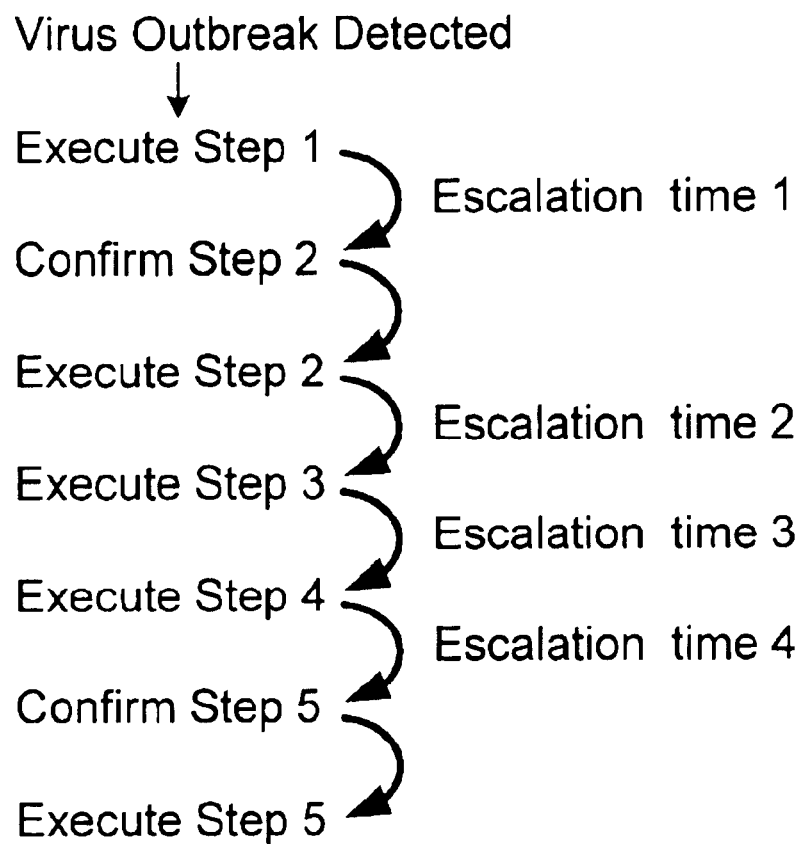
FIG. 5 illustrates an example sequence of predefined actions that may be taken in response to a virus outbreak.

When a computer virus outbreak has been detected, then the system of the present invention provides an at least partially automated response to that detected outbreak following a predetermined sequence of actions. FIG. 5 illustrates this technique. Some of the steps require a user to confirm that they should be executed before they are executed. As shown in FIG. 5, steps 1, 3 and 4 execute automatically following expiry of their escalation time whereas steps 2 and 5 require user confirmation prior to being executed.

When the virus outbreak is detected, step 1 is immediately executed. If the virus outbreak is detected as persisting despite the execution of step 1 and after the expiry of the escalation time associated with step 1, then processing proceeds to seek confirmation that step 2 should be executed. Assuming such confirmation is received, then step 2 is executed and a determination made after an escalation time associated with step 2 as to whether or not the virus outbreak is still persisting. In this way, a predefined sequence of steps are executed spaced by appropriate escalation times set to allow the respective executed step to take effect in order that it may be determined whether or not the virus outbreak has been overcome. In general, the severity and adverse consequences of the various steps in the predefined sequence to the normal operation of the system upon which they reside increases as you progress through the sequence. Accordingly, it is desirable to check after the associated escalation time associated with each step as to whether or not it has been effective since this may avoid the need to execute a more severe counter-measure that would unnecessarily adversely affect the normal operation of the computer system.

The counter-measures that may be taken in the predefined sequence can vary considerably. As examples, given in an order that has been found to provide an appropriate balance between effectiveness and impact upon normal operation, are as follows:

1. Reducing virus detection notifications to reduce server workload;

2. Switching from virus quarantining to virus deletion when a virus is detected;

3. Increasing how thoroughly the computer system is scanned to detect computer viruses, e.g. the scanning options may be adjusted to scan all file types rather than just some file types, to scan files being read as well as files being written, or some other increase in the thoroughness of the scanning;

4. Automatically sending a copy of detected computer virus to a remote site for analysis. Returning to FIG. 1, the local area network 2 may detect a computer virus outbreak and seek to deal with it via the automated response. At some stage in this response, the local area network 2 may send a copy of the computer virus across the internet link 8 to the suspect file repository 22 in the computer system 4 of the anti-virus system provider.

5. Downloading a latest version of the virus definitions file from a remote site in order to increase the likelihood of success of the counter-measures by using the very latest virus definitions. This latest virus definition library may be downloaded from the computer system 4 of the anti-virus system provider via the internet link 8 in a similar way to the preceding step of uploading a copy of the suspect file.

6. An "on demand" scan of all of the computer files stored on the file server 12, the firewall server 16, the mail server 18 and individual client computers 14 of the local area network 2 may be performed.

Such an on-demand scan represents a considerable processing load and is likely to degrade the performance of the local area network 2 while it is taking place, but this may nevertheless be desirable if the computer virus outbreak has persisted despite the preceding counter-measures.

7. Blocking E-mail attachments that appear in excess of a threshold level or blocking all E-mail attachments. The measurement parameters of the E-mail system or bespoke routines within the anti-virus program may detect if particular files or types of files are associated with E-mails being sent or received upon the computer system that has the virus outbreak. If the number of attachments exceeds a predetermined threshold level, then the anti-virus system may interact with the E-mail systems to block further attachments of that file, that file type or all attachments.

8. A recent common type of virus is one that automatically reads a computer user's E-mail address book and distribution lists and then sends itself to those identified E-mail addresses as a way of propagating itself. A counter-measure effective against such viruses is to automatically hide or render inoperative all users' address books or distribution lists such that they may not be read and used by this type of virus.

9. A drastic step that may be taken against a sever virus outbreak is to shutdown the E-mail server 18 and either re-start it in Administrator only mode or not restart it at all. Such a drastic measure is highly likely to be effective against computer viruses using the E-mail services to propagate themselves, but clearly will have a severe adverse impact upon normal use of the computer system.

Figure 6:
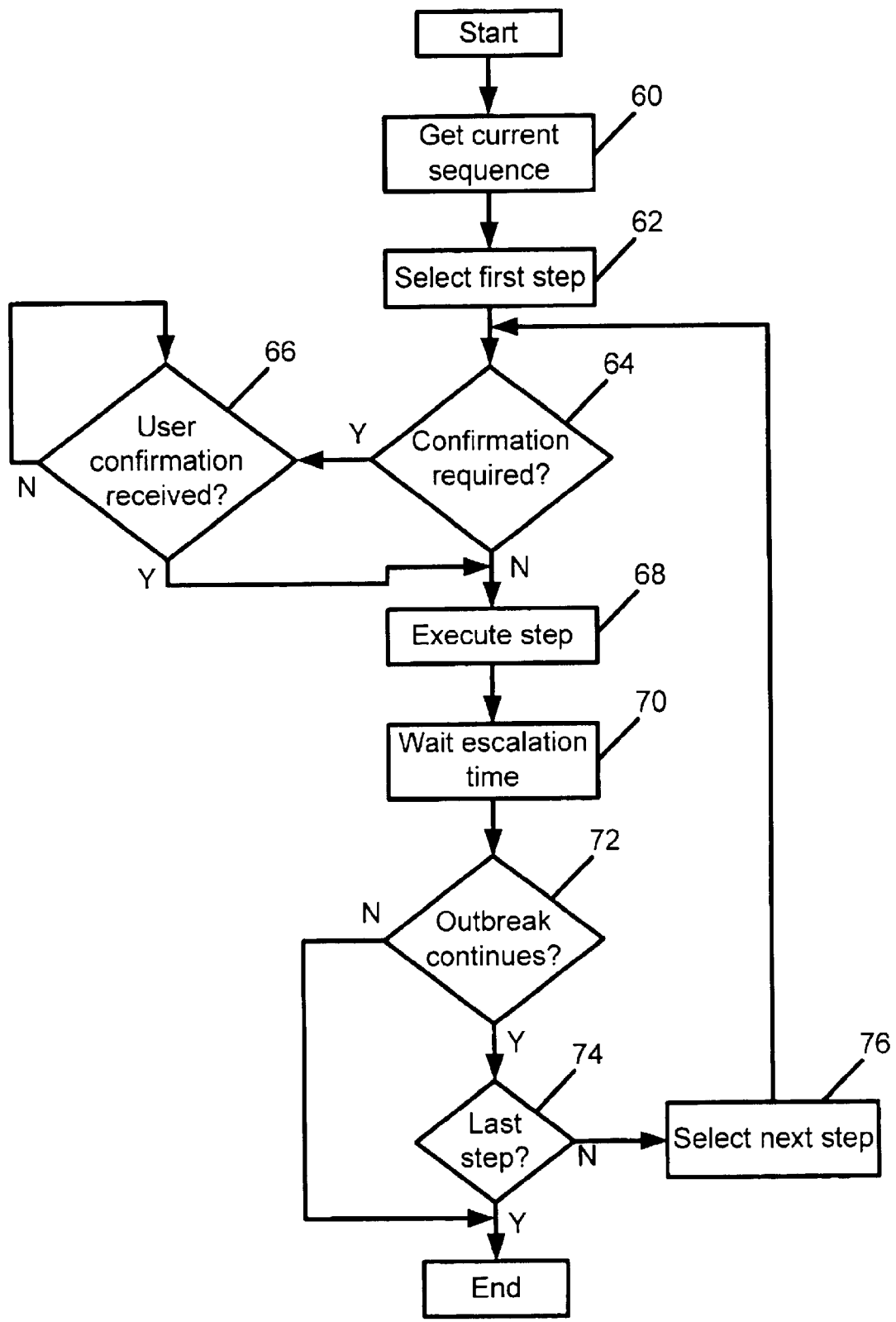
FIG. 6 is a flow diagram illustrating the process of taking a sequence of predefined actions in response to a virus outbreak.

FIG. 6 is a flow-diagram illustrating the sequence of predetermined steps (that may be automatic or prompted, possibly selected in dependence upon time) that may be followed in response to a detected virus outbreak.

At step 60, the latest sequence of steps appropriate to the particular time of day and day of week is read. As with the measurement parameters and threshold levels, the predetermined sequence can be varied in dependence upon the time of day and day of week to more appropriately match the use of the system at these times and the availability of support staff to interact with the systems upon occurrence of a virus outbreak.

At step 62 the first counter-measure step is selected. At step 64 a test is made as to whether user confirmation is required prior to execution of the currently selected step. If user confirmation is required, then this is sought via step 66 before processing proceeds to step 68 at which the selected step is executed. If confirmation is not required, then processing proceeds directly from step 64 to step 68.

Step 70 serves to wait for an escalation time associated with the current step after that step has been executed before a test is made at step 72 to determine whether the virus outbreak is continuing. The test applied at step 72 may comprise running the routine illustrated in FIG. 4.

If step 72 reveals that the outbreak has been stopped, then processing ends. If the outbreak is persisting, then processing proceeds to step 74 at which a determination is made as to whether or not the last step in the predetermined sequence of steps has yet been applied. If the last step has already been applied, then processing terminates. Alternatively, if the last step has not yet been applied, then processing proceeds to step 67 at which the next step is selected prior to returning processing to step 64.

A description of the set-up and user interaction with the computer program described above is given in the following description:

Configuration Wizard

The Configuration wizard User Interface (UI) is based on the approach taken in the Microsoft Outlook Rules wizard. The first dialog contains a list of user-defined events and re-actions (rules). These outbreak rules are listed in an order which determines the priority in which determination of an outbreak will occur. The user follows a set of wizard dialogs specifying the data they require for the outbreak event and action. The information is stored in an .INI file to aid in cross-platform portability.

Figure 7:
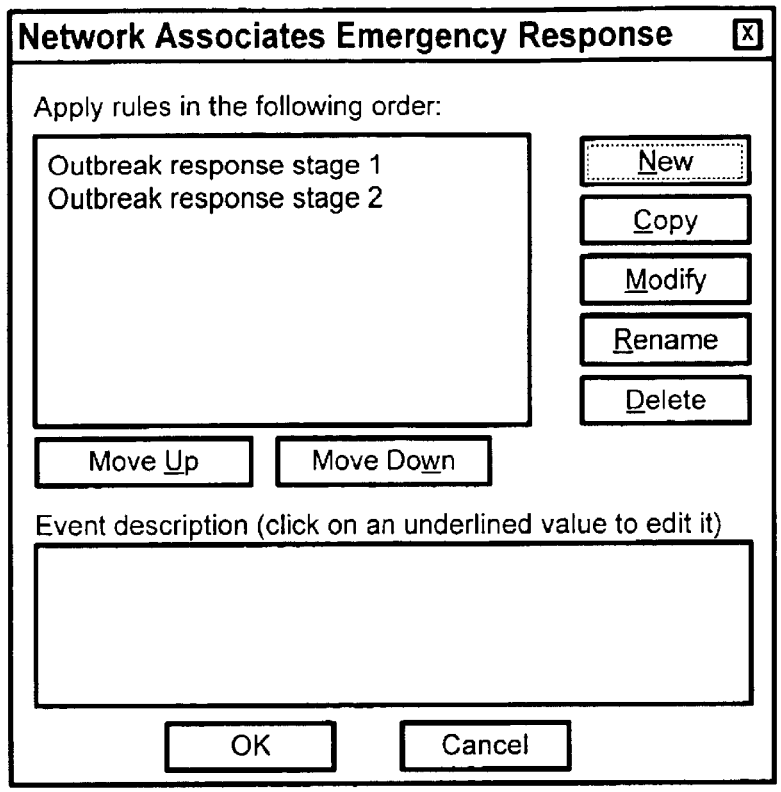

The initial dialog for the wizard (see FIG. 7) allows the user to add, copy, modify, rename and delete Outbreak rules for the system. You are also able to order the rules by priority using the move up and move down buttons. When the outbreak service (for example NT Service) is checking if outbreaks are occurring, it works its way down the list from the top to the bottom. The dialog also has a description pane to describe the rule whenever one is highlighted in the outbreak list.

Figure 8:
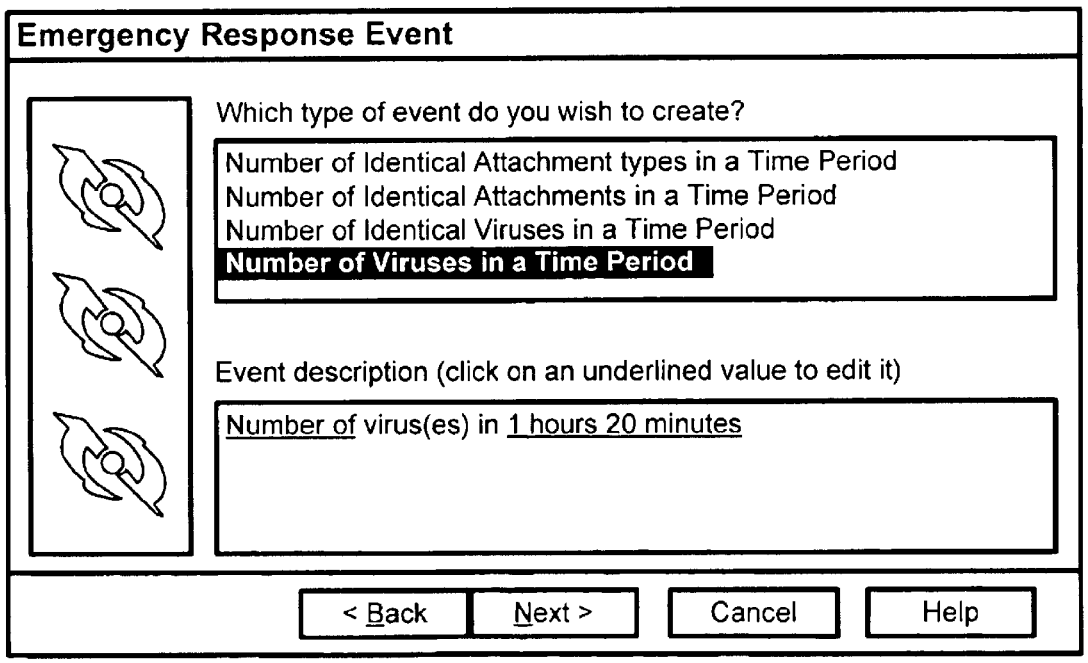

When the user presses new or modify they progress through the outbreak wizard pages starting with the one shown in FIG. 8.

Event Wizard Page

The wizard page functions similar to the Microsoft Outlook rules wizard. The user selects an event type in the event list and an English description appears below. There are a series of underlined words. The user clicks on these as if they were html links in a web browser. Upon clicking, a dialog appears asking them to enter a value (see FIG. 9). Once the value is entered it replaces the placeholder but is also underlined and clickable for the user to change/edit.

There is also a threshold event. This allows a user to set, for example, peak mail throughput thresholds for a period in the i.e. am, midday and pm (see FIG. 10).

Upon specifying the event required for an outbreak. The user can click next to move onto the next wizard page. They are not able to progress until the relevant event values have been filled out (in accordance with the table below).

Figures 11, 12, 13:

Upon clicking the Next button, the wizard in FIG. 11 is displayed.

| Name | Type | Details |
| --- | --- | --- |
| Number of hours | Numeric | 0–23 |
| Number of minutes | Numeric | 0–59 |
| Threshold minimum | Numeric | None |
| Threshold maximum | Numeric | None |
| Threshold value | Numeric | None |

Reaction Type Wizard Page

Figure 14:
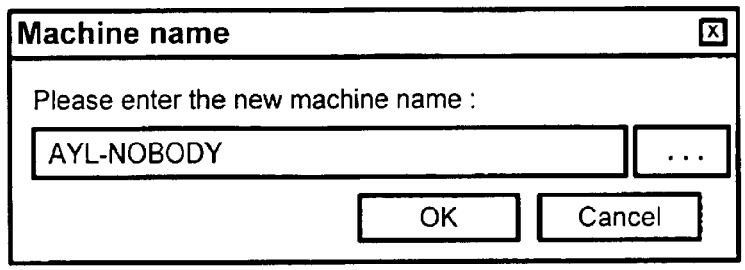
Figure 15:
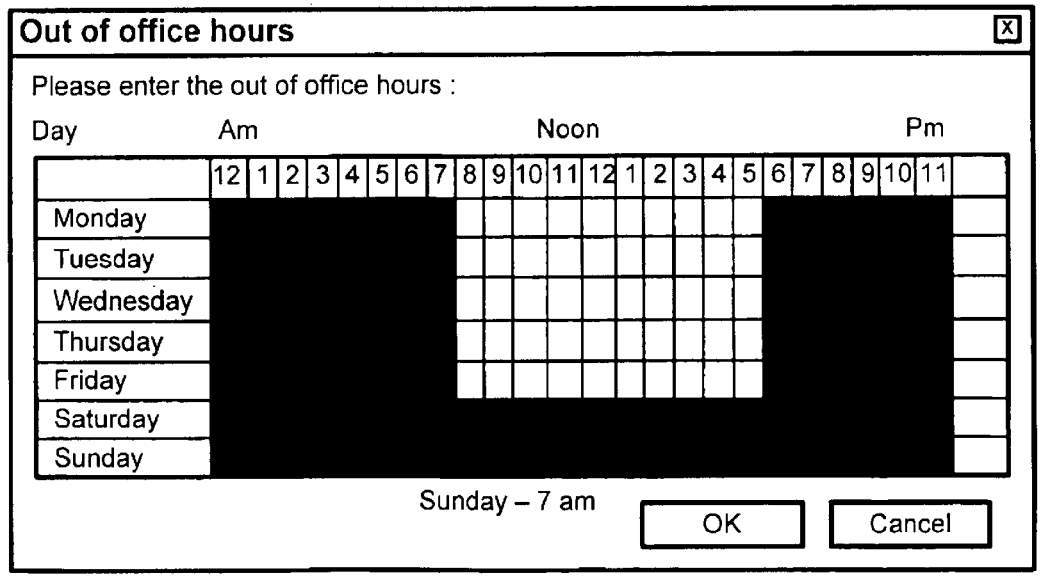

The user is then able to specify the action they require upon an outbreak being detected. There are two categories of action, Manual and Automatic. Upon selection of Manual, the user can specify to be notified via email, network broadcast or pager. They then fill out any notification details using the html type links (See FIGS. 12, 13 and 14). Upon selecting out of office hours, the user enters the times they are out of the office during the week. FIG. 15 shows the selection control which functions in the same manner as the scheduling control in Microsoft Exchange Administrator for scheduling replication.

Once all the values have been filled out for manual notifications, the user continues to either the finish wizard page or the reactions page depending upon what has been selected. If manual reaction has been selected, the reaction page will only appear if they have selected "Use out of office hours".

Data Validation for Notification

| Name | Type | Details |
| --- | --- | --- |
| Email Address | Alpha Numeric | Valid Email Format i.e. Has . and @ symbols |
| Pager Numer | Numeric | None |
| Network Broadcast | Alpha Numeric | Valid Computer name |

Automatic Virus Reaction Wizard Page

Upon completing the reaction type, the user is presented with the wizard page shown in FIG. 16. The user then has the ability to add and remove items from the list using the buttons at the bottom of the list. The add button will bring up a dialog displaying a choice of available actions to take as in FIG. 17. The move up and move down buttons allow the user to specify the order in which the reactions are carried out. They are then able to specify a time period in which to escalate to the next item in the list. The user can have one or more reaction types in the list. Escalations work down the list from top to bottom. Upon reaching the last item and the event still firing, then notifications will be sent to an administrator via e-mail. An escalation occurs if the event is still firing after the time period for the current action has been exceeded.

The user is also able to specify an outbreak report created (in a file on the hard disk) upon an outbreak being detected. This provides a history of what has happened during detection and automated reaction (an audit trail). The report option defaults to on.

For any action that is considered extreme, the user will be warned via a message box to ensure that they are aware of the data entered.

Data validation for escalation.

| Name | Type | Details |
|---|---|---|
| Escalation hours | Numeric | None |
| Escalation minutes | Numeric | 0–59 |

Outbreak Summary Wizard Page

Lastly the summary wizard page shows what has been completed during the earlier pages. When the user clicks finish they will return to the dialog shown in FIG. 7.

Outbreak Wizard Flowchart

Figure 19:
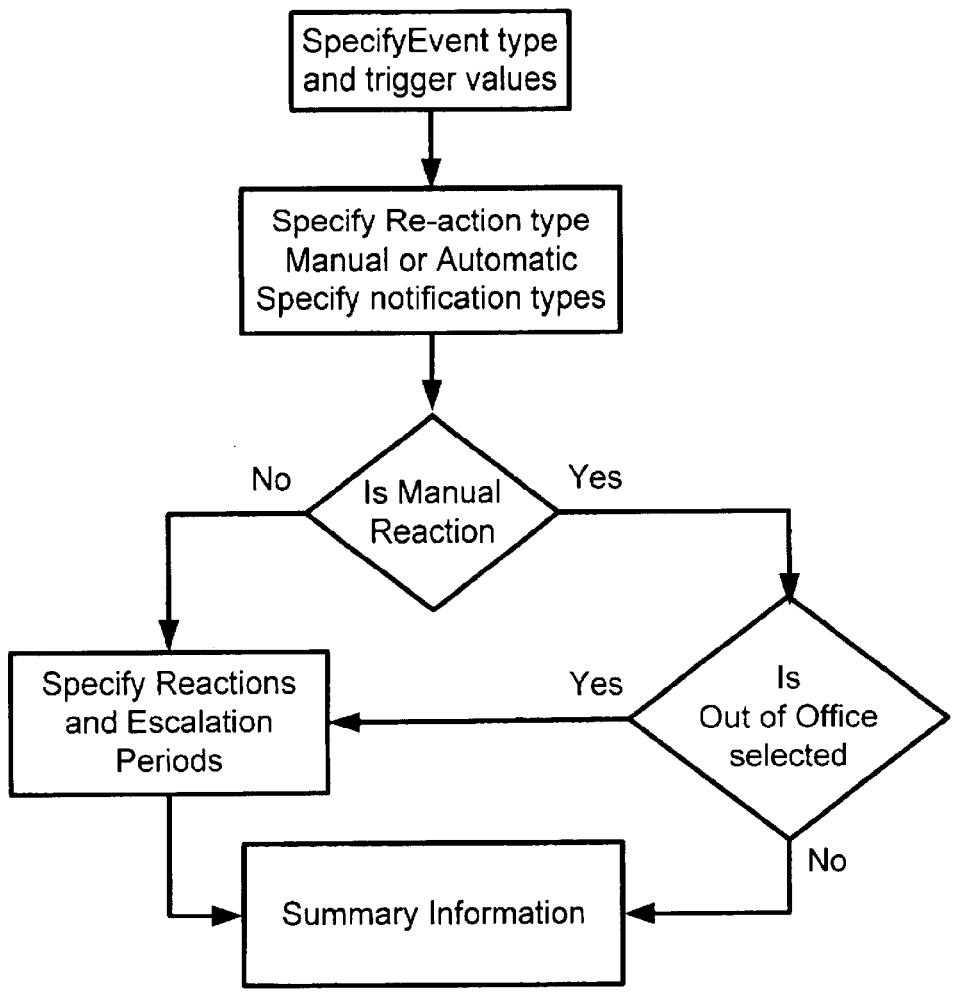

See FIG. 19.

Outbreak Service

Figure 20:
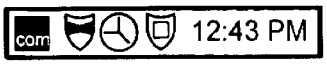
Figure 21:
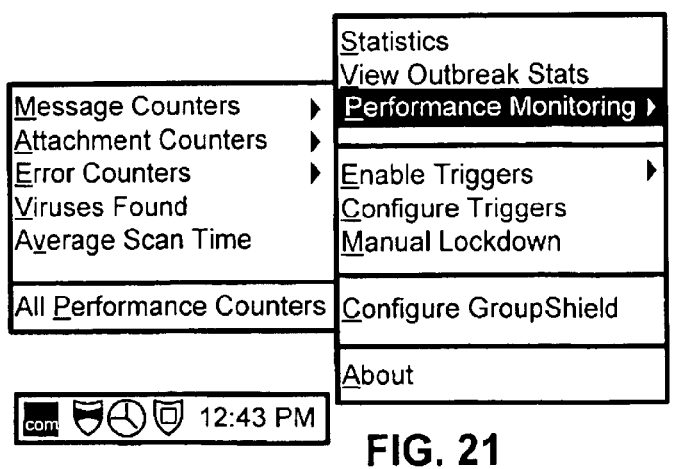

The outbreak service runs as an NT service and can be stopped and started using the services applet in the control panel. The service runs under the system account and therefore can interact with the desktop. There is an icon added to the task bar tray (see FIG. 20) which provides a popup menu (see FIG. 21).

Figure 22:
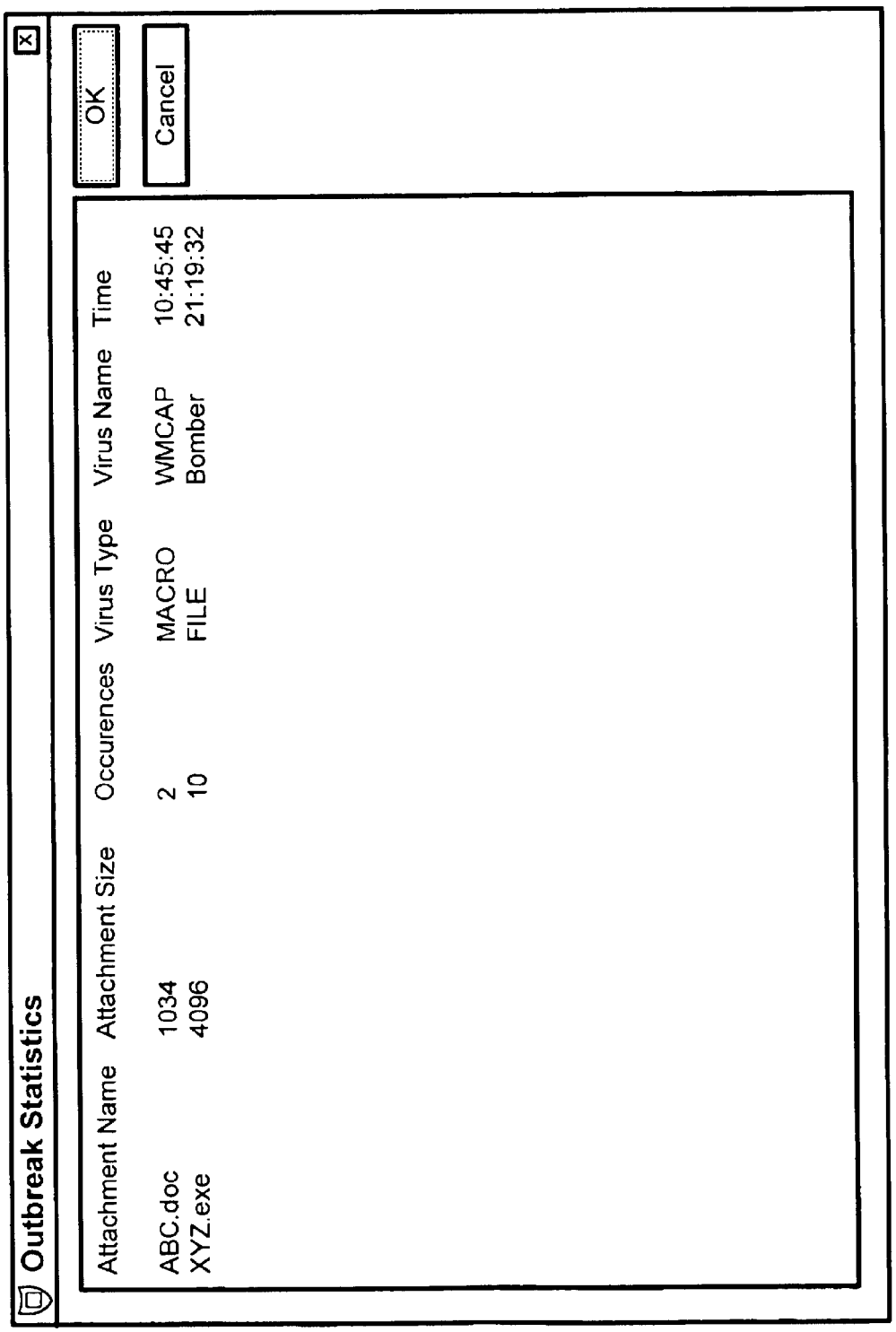

The popup menu provides the ability to view general statistics (i.e. when outbreak thresholds were exceeded and what actions were taken) and outbreak event specific statistics (see FIG. 22). The outbreak event statistics display enough information to the user to be able to intelligently set the outbreak thresholds for the event.

Figure 23:
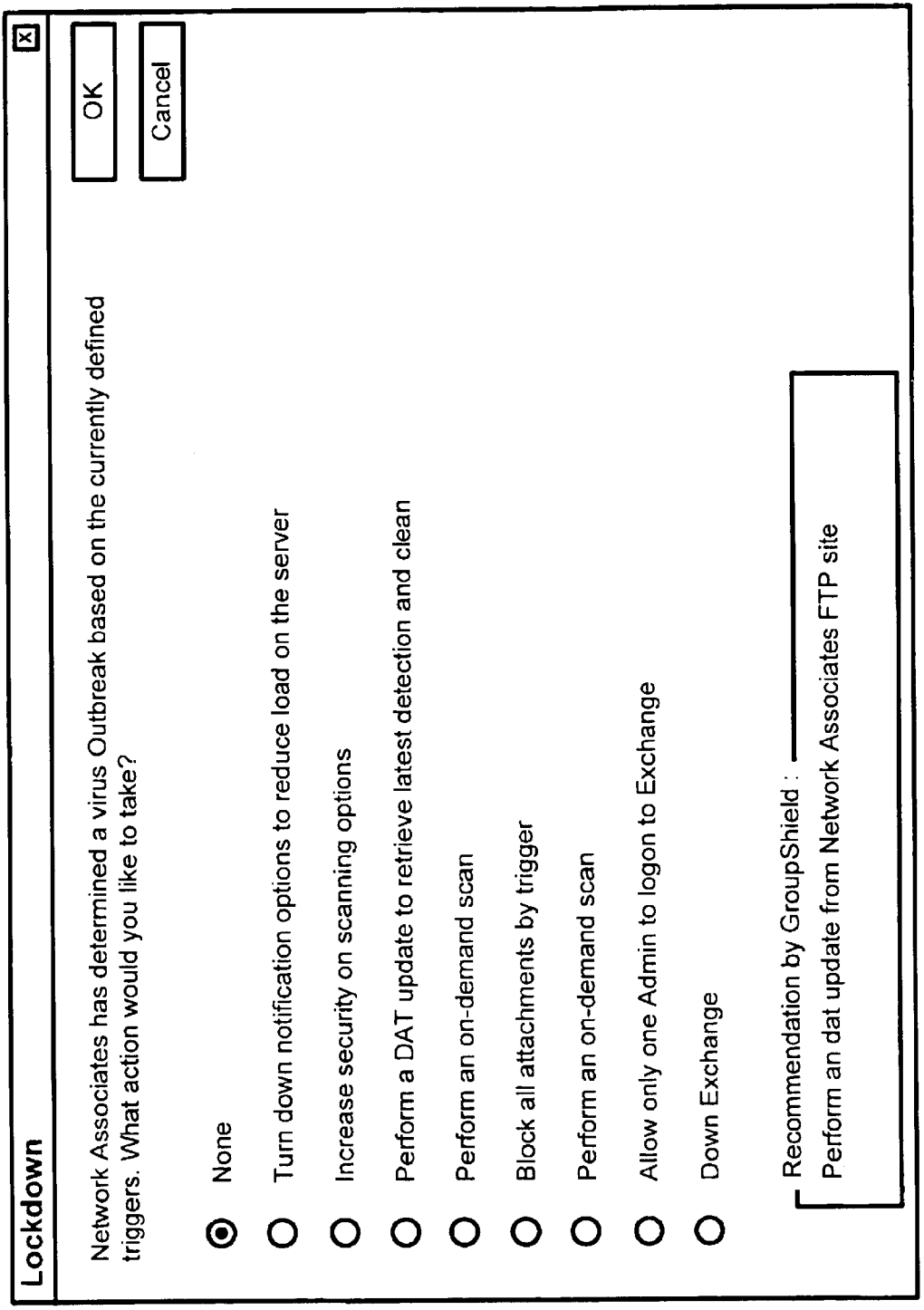

The outbreak service upon a manual event displays the lock down dialog (see FIG. 23) with a list of actions to take. This is also available from the popup menu whenever the user requires. They are then able to select the required action. The UI will only appear on the server that is running the outbreak service.

Outbreak events are also enabled/disabled via the popup menu. A tick is placed along side each event that is currently enabled. The popup menu is also able to spawn the performance monitor along with the relevant perfmon work spaces. This will allow the application performance counters to be loaded and configured in performance monitor.

The configuration of the app can also be started from the popup menu. In this case it will load Microsoft Exchange admin.exe.

Appendix A

Events and actions are described below for the Microsoft Exchange version of the product.

Events

Number of viruses over a time period

Number of identical viruses over a time period

Number of identical attachments over a time period

Number of identical attachment types over a time period

Number of viruses per user over time (On-demand scan only???)

Throughput>Threshold

Delta from previous 24 hours (Number of virus over twenty four hours)

Actions

Actions will be Manual or Automatic. Manual will notify the user only and not perform any actions unless "Use out of office hours" is specified and the event is triggered during the specified out of office hours.

Notify user (e-mail, pager, network broadcast).

Reduce notifications to reduce server load.

Set to delete on infection instead of current quarantining setting to reduce load.

Increase the scan options—scan all files, enable all heuristics.

Perform a DAT update.

Perform an on-demand scan.

Block the items that caused the event (i.e. 500 docs in an hour triggered an event, so block all doc files.

Block all attachments.

Hide Distribution lists to prevent E-mail enabled viruses from E-mailing themselves to large groups of people.

Hide Mailboxes to prevent E-mail enabled viruses from E-mailing themselves to your users.

Down the Exchange server and bring back up only allowing the admin to log on.

Down Exchange and leave it down.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a computer readable medium for detecting an outbreak of a computer virus on a computer system, said computer program product comprising:

(i) measurement computer code operable to measure one or more measurement parameters indicative of non virus specific activity of said computer system over a respective measurement period;

(ii) comparison computer code operable to compare said one or more measurement parameters with respective predetermined threshold levels, wherein one of said measurement parameters is e-mail throughput within said computer system, wherein each e-mail processed has an associated size value and e-mail throughput is measured in a form dependent upon a number of e-mails and a total of size values for said e-mails within a predetermined period; and (iii) signal generating computer code operable to generate a signal indicative of an outbreak of a computer virus if one or more of said one or more measurement parameters crosses a respective predetermined threshold level;

wherein one of said measurement parameters is how many e-mail messages are sent having an identical message title.

2. A computer program product as claimed in claim 1, wherein one of said measurement parameters is how many e-mail messages are sent having an identical file attachment.

3. A computer program product as claimed in claim 1, wherein one of said measurement parameters is how many e-mail messages are sent having a file attachment of a given file type.

4. A computer program product as claimed in claim 3, wherein said given file type is an executable file type.

5. A computer program product as claimed in claim 1, wherein said respective predetermined threshold levels are varied in dependence upon time of day.

6. A computer program product as claimed in claim 1, wherein said respective predetermined threshold levels are varied in dependence upon day of week.

7. A computer program product as claimed in claim 1, wherein said one or more measurement parameters are user selectable.

8. A computer program product as claimed in claim 1, wherein said respective measurements periods are user selectable.

9. A computer program product as claimed in claim 1, wherein said respective predetermined threshold levels are user selectable.

10. A method of detecting an outbreak of a computer virus on a computer system, said method comprising the steps of:
(i) measuring one or more measurement parameters indicative of non virus specific activity of said computer system over a respective measurement period;
(ii) comparing said one or more measurement parameters with respective predetermined threshold levels, wherein one of said measurement parameters is e-mail throughput within said computer system, wherein each e-mail processed has an associated size value and e-mail throughput is measured in a form dependent upon a number of e-mails and a total of size values for said e-mails within a predetermined period; and
(iii) generating a signal indicative of an outbreak of a computer virus if one or more of said one or more measurement parameters crosses a respective predetermined threshold level;
wherein one of said measurement parameters is how many e-mail messages are sent having an identical message title.

11. A method as claimed in claim 10, wherein one of said measurement parameters is how many e-mail messages are sent having an identical file attachment.

12. A method as claimed in claim 10, wherein one of said measurement parameters is how many e-mail messages are sent having a file attachment of a given file type.

13. A method as claimed in claim 12, wherein said given file type is an executable file type.

14. A method as claimed in claim a 10, wherein said respective predetermined threshold levels are varied in dependence upon time of day.

15. A method as claimed in claim 10, wherein said respective predetermined threshold levels are varied in dependence upon day of week.

16. A method as claimed in claim 10, wherein said one or more measurement parameters are user selectable.

17. A method as claimed in claim 10, wherein said respective measurements periods are user selectable.

18. A method as claimed in claim 10, wherein said respective predetermined threshold levels are user selectable.

19. Apparatus for detecting an outbreak of a computer virus on a computer apparatus, said system comprising:
(i) measuring logic operable to measure one or more measurement parameters indicative of non virus specific activity of said computer system over a respective measurement period;
(ii) comparing logic operable to compare said one or more measurement parameters with respective predetermined threshold levels, wherein one of said measurement parameters is e-mail throughput within said computer system, wherein each e-mail processed has an associated size value and e-mail throughput is measured in a form dependent upon a number of e-mails and a total of size values for said e-mails within a predetermined period; and
(iii) signal generating logic operable to generate a signal indicative of an outbreak of a computer virus if one or more of said one or more measurement parameters crosses a respective predetermined threshold level;
wherein one of said measurement parameters is how many e-mail messages are sent having an identical message title.

20. Apparatus as claimed in claim 19, wherein one of said measurement parameters is bow many e-mail messages are sent having an identical file attachment.

21. Apparatus as claimed in claim 19, wherein one of said measurement parameters is how many e-mail messages are sent having a file attachment of a given file type.

22. Apparatus as claimed in claim 21, wherein said given file type is an executable file type.

23. Apparatus as claimed in claim 19, wherein said respective predetermined threshold levels are varied in dependence upon time of day.

24. Apparatus as claimed in claim 19, wherein said respective predetermined threshold levels are varied in dependence upon day of week.

25. Apparatus as claimed in claim 19, wherein said one or more measurement parameters are user selectable.

26. Apparatus as claimed in claim 19, wherein said respective measurements periods are user selectable.

27. Apparatus as claimed in claim 19, wherein said respective predetermined threshold levels are user selectable.

* * * * *

UNITED STATES PATENT AND TRADEMARK OFFICE
CERTIFICATE OF CORRECTION

PATENT NO. : 6,886,099 B1
APPLICATION NO. : 09/660300
DATED : April 26, 2005
INVENTOR(S) : Smithson et al.

Page 1 of 1

It is certified that error appears in the above-identified patent and that said Letters Patent is hereby corrected as shown below:

col. 12, line 2 change "apparatus" to --system--;
col. 12, line 24 change "bow" to --how--.

Signed and Sealed this

Twentieth Day of November, 2007

JON W. DUDAS
*Director of the United States Patent and Trademark Office*